US011457560B2

(12) United States Patent
Smith et al.

(10) Patent No.: US 11,457,560 B2
(45) Date of Patent: Oct. 4, 2022

(54) OPERATOR CONTROL SYSTEM FOR AN OUTDOOR POWER EQUIPMENT MACHINE

(71) Applicant: MTD PRODUCTS INC, Valley City, OH (US)

(72) Inventors: Aaron Smith, Zionsville, IN (US); Kevin Meister, Indianapolis, IN (US); Jay E. Maggard, Polk, OH (US)

(73) Assignee: MTD PRODUCTS INC, Valley City, OH (US)

( * ) Notice: Subject to any disclaimer, the term of this patent is extended or adjusted under 35 U.S.C. 154(b) by 202 days.

(21) Appl. No.: 16/778,831

(22) Filed: Jan. 31, 2020

(65) Prior Publication Data

US 2020/0245550 A1    Aug. 6, 2020

Related U.S. Application Data

(60) Provisional application No. 62/800,558, filed on Feb. 3, 2019.

(51) Int. Cl.
*A01D 34/00* (2006.01)
*G05G 1/04* (2006.01)
(Continued)

(52) U.S. Cl.
CPC ........... *A01D 34/008* (2013.01); *A01D 34/42* (2013.01); *E02F 9/205* (2013.01); *G05G 1/01* (2013.01);
(Continued)

(58) Field of Classification Search
CPC ...... A01D 2034/6843; A01D 2034/907; A01D 34/006; A01D 34/008; A01D 34/42;
(Continued)

(56) References Cited

U.S. PATENT DOCUMENTS 4,318,266 A * 3/1982 Taube .................. A01D 34/008
56/10.2 R
5,351,778 A   10/1994 Shigemi et al.
(Continued)

FOREIGN PATENT DOCUMENTS

FR           3000273 A1    6/2014
KR       20180058586 A  * 6/2018
WO        2017069683 A1   4/2017

OTHER PUBLICATIONS

International Search Report and Written Opinion issued in International Application No. PCT/US2020/016159 dated May 6, 2020; 14 pages.

*Primary Examiner* — Adam J Behrens
(74) *Attorney, Agent, or Firm* — Wegman Hessler

(57) ABSTRACT

A removably attached operator control unit for controlling operation of an outdoor power equipment machine includes an operator control unit housing, a first joystick and a second joystick extending from an upper housing portion, the first and second joysticks being configured to communicate control actions to a control circuit of the operator control unit, and at least one switch configured to communicate control actions to the control circuit, wherein the control circuit is operable to receive control actions resulting from actuations of the joysticks, and switch and to communicate utilizing an interface arranged between the operator control unit and the outdoor power equipment machine, and when secured to the outdoor power equipment machine, the operator control unit is located at a height that is within about an arm's length or less of an operator standing immediately adjacent to the outdoor power equipment machine.

19 Claims, 6 Drawing Sheets

(51) Int. Cl.
*A01D 34/42* (2006.01)
*G05G 1/01* (2008.04)
*G05G 5/05* (2006.01)
*E02F 9/20* (2006.01)
*A01D 34/47* (2006.01)
*A01D 34/54* (2006.01)

(52) U.S. Cl.
CPC .............. *G05G 1/04* (2013.01); *G05G 5/05* (2013.01); *A01D 34/47* (2013.01); *A01D 34/54* (2013.01); *G05G 2505/00* (2013.01)

(58) Field of Classification Search
CPC .... A01D 34/824; A01D 34/828; A01D 34/82; A01D 34/62; G05G 1/01; G05G 1/04; G05G 1/06; G05G 1/082; G05G 5/05; G05G 9/047; E02F 9/205; E02F 9/2004
See application file for complete search history.

(56) References Cited

U.S. PATENT DOCUMENTS

| | | | | |
|---|---|---|---|---|
| 5,397,890 | A * | 3/1995 | Schueler | H03K 17/941 180/272 |
| 5,524,368 | A | 6/1996 | Struck et al. | |
| 6,493,613 | B2 * | 12/2002 | Peless | A01D 34/008 56/10.2 A |
| 7,318,493 | B2 * | 1/2008 | Medina | B60K 1/02 180/167 |
| 7,677,344 | B2 * | 3/2010 | Medina | A01D 42/00 180/167 |
| 10,040,672 | B2 * | 8/2018 | Haug | H01H 9/0214 |
| 10,126,741 | B2 * | 11/2018 | Gates | E01H 5/098 |
| 10,631,456 | B1 * | 4/2020 | Siudyla | G05D 1/0011 |
| 10,869,425 | B1 * | 12/2020 | Siudyla | B62D 1/00 |
| 11,157,035 | B2 * | 10/2021 | Liang | G05G 9/047 |
| 2007/0294991 | A1 * | 12/2007 | Medina | A01D 42/06 56/11.9 |
| 2008/0266254 | A1 * | 10/2008 | Robbins | G05D 1/0044 345/161 |
| 2016/0319514 | A1 * | 11/2016 | Dolan | E02F 9/2235 |
| 2018/0217587 | A1 * | 8/2018 | Gates | A01D 34/008 |
| 2020/0120865 | A1 * | 4/2020 | Di Biase | A01D 34/44 |
| 2020/0120866 | A1 * | 4/2020 | Conrad | A01D 34/78 |
| 2020/0390029 | A1 * | 12/2020 | Ruberton | G05D 1/0016 |

* cited by examiner

OPERATOR CONTROL SYSTEM FOR AN OUTDOOR POWER EQUIPMENT MACHINE

CROSS REFERENCE TO RELATED APPLICATIONS

This application claims the benefit of U.S. Provisional Application No. 62/800,558, filed Feb. 3, 2019, the entire disclosure of which is incorporated herein by reference.

FIELD OF THE INVENTION

The disclosed systems are directed to operator control systems for outdoor power equipment machines, and more particularly, to removably attachable control systems for autonomous devices. In an aspect, the disclosed systems are suitable for movement, steering, speed, maintenance, and working mode coordination for an autonomous mower.

BACKGROUND OF THE INVENTION

Most outdoor power equipment machines must be moved manually at some point of operation or during deployment. Generally, operator controls are available at a handle portion of the machine, located at one end of the machine, typically the back or rear. While these types of controls are generally suitable, they do not provide a good solution for some operations, such as maneuvering a machine backwards onto a trailer for transport rather than driving it on forwards, and other maneuvers that require the operator to walk backwards, creating a potential for the operator to become trapped between the machine and a stationary structure. Operator controls that are integral to a machine and placed traditionally at one end of the machine, many times require the operator to walk backwards while performing some operations or maneuvers, creating safety issues.

BRIEF SUMMARY OF THE INVENTION

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

In one aspect, a removably attached operator control unit for controlling operation of an outdoor power equipment machine includes an operator control unit housing including an upper housing portion and a lower housing portion, a first joystick and a second joystick extending from the upper housing portion, the first and second joysticks being configured to communicate control actions to a control circuit of the operator control unit, at least one switch located on said upper housing portion, the switch configured to communicate control actions to the control circuit, a toggle switch moveable between a first position and a second position, the toggle switch configured to communicate control actions to the control circuit, wherein the control circuit is operable to receive control actions resulting from actuations of the joysticks, switch, and toggle switch and to communicate utilizing an interface arranged between the operator control unit and the outdoor power equipment machine, and when secured to the outdoor power equipment machine, the operator control unit is located at a height that is within about an arm's length or less of an operator standing immediately adjacent to the outdoor power equipment machine.

In an aspect, the operator control unit includes a handle adapted to be held in at least one hand of the outdoor power equipment machine operator, wherein at least one of the first joystick and the second joystick are within operable reach without removing the hand from the handle.

In an aspect, the operator control unit includes an operator presence sensing system configured to sense the presence of the at least one hand of an outdoor power equipment machine operator at the handle.

In an aspect, the operator control unit includes operation of the outdoor power equipment machine is enabled based on detection of two hands of the operator at the handle.

In an aspect, the outdoor power equipment machine includes a docking port located at the rear of the outdoor power equipment machine configured to receive the operator control unit.

In an aspect, the operator control unit includes corresponding features for securing and docking the operator control unit to the outdoor power equipment machine at the docking port.

In an aspect, the operator control unit includes a first joystick guide having an elongated opening sized and shaped to receive the first joystick and to allow movement of the first joystick in a longitudinal direction, a second joystick guide having an elongated opening sized and shaped to receive the second joystick and to allow movement of the second joystick in a transverse direction.

In an aspect, the operator control unit includes the first joystick operable to control a forward and reverse motion and a forward and reverse speed of the outdoor power equipment machine.

In an aspect, the operator control unit includes the first joystick positioned to be operated by a left hand of an operator and the second joystick is positioned to be operated by a right hand of the operator.

In an aspect, the operator control unit includes the first joystick positioned to be operated by a digit of a right hand of an operator and the second joystick positioned to be operated by a digit of a left hand of the operator.

In an aspect, the operator control unit includes the first joystick is spring loaded and operates as a throttle, returning to a neutral position when released, and the second joystick is operable to control a steering mechanism of the outdoor power equipment machine.

In an aspect, the operator control unit includes at least one switch comprising a first momentary switch and a second momentary switch configured to communicate with the control circuit to cause action of a payload associated with the outdoor power equipment machine when either of the first momentary switch and the second momentary switch are actuated.

In an aspect, the operator control unit includes the payload comprising a cutting unit and actuation of the first momentary switch causes the cutting unit to move upwardly, and actuation of the second momentary switch causes the cutting unit to move downwardly.

In an aspect, the operator control unit includes at least one switch comprising a service switch, wherein actuation of the service switch causes the outdoor power equipment machine to enter a service mode such that a cutting unit associated with the outdoor power equipment machine is raised to a position that facilitates a maintenance operation.

In an aspect, the operator control unit includes at least one switch comprising a cutting reel switch, and wherein actuation of the cutting reel switch controls motion of a cutting unit associated with the outdoor power equipment machine.

In an aspect, the operator control unit includes at least one switch comprising a service switch and a cutting reel switch, and wherein actuation of the service switch, the cutting reel switch, and the first joystick cause the outdoor power equipment machine to operate in a back lap mode.

In an aspect, the operator control unit includes the service switch and the cutting reel switch comprise integral light emitting diode indicators. In an aspect, the back lap mode includes disabling a steering mechanism of the outdoor power equipment machine, raising a cutting reel of the outdoor power equipment machine, and rotating the cutting reel in a reverse (counter-clockwise) direction at a back lapping speed.

In an aspect, the operator control unit includes wherein the interface arranged between the operator control unit and the outdoor power equipment machine comprises a wireless interface.

In an aspect, the operator control unit includes wherein the outdoor power equipment machine comprises an autonomous mower.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

Figure 1:
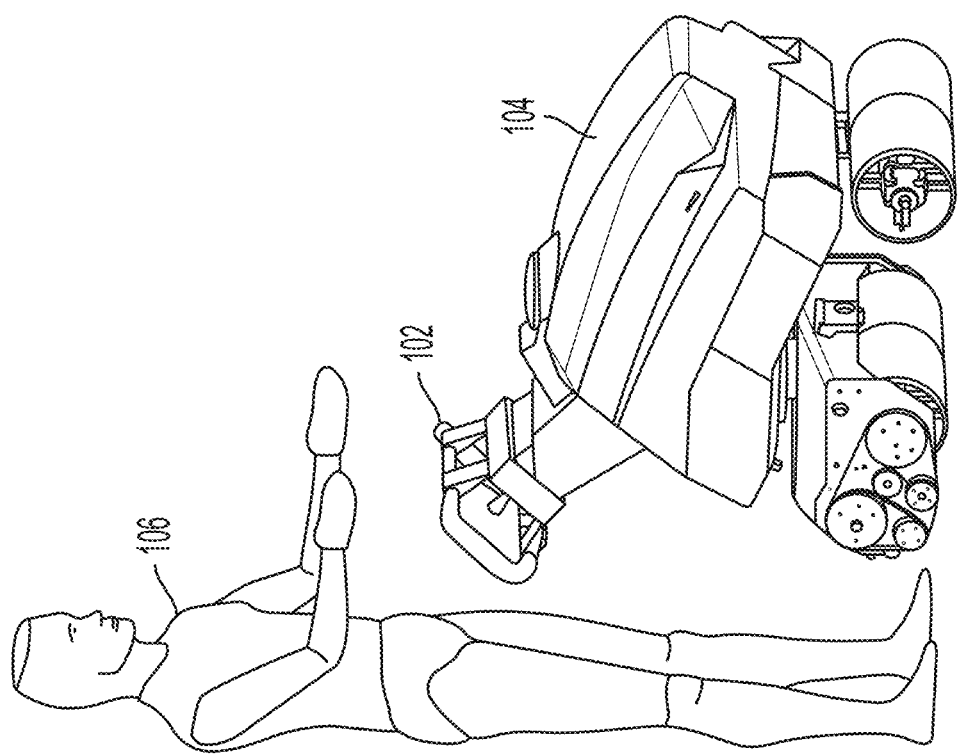
FIG. 1 is an illustration of a user and an example operator control system and outdoor power equipment machine in accordance with aspects of the disclosure.

It should be noted that all the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments. Accordingly, the drawings and description are to be regarded as illustrative in nature and not as restrictive.

DETAILED DESCRIPTION

The following terms are used throughout the description, the definitions of which are provided herein to assist in understanding various aspects of the subject disclosure.

As used herein, the terms "outdoor power equipment machine", "autonomous mower", "robotic mower", "vehicle, "device" and "robot" refer to an autonomous robot, or most any autonomous device, vehicle or machine that performs various tasks and functions including lawn mowing, lawn maintenance, vacuum cleaning, floor sweeping and the like. As used herein, the terms "outdoor power equipment machine", "vehicle, "device" and "machine" refer to most any device, or machine, wherein the device or machine is not necessarily autonomous.

As used herein, the terms "operator control unit", "user interface", "remote control", and "control unit", refer to a device for control of a machine or apparatus having the control unit physically co-located with the machine, and/or from a distance, by means of signals transmitted from a radio or electronic device of the control unit.

In the following description, for purposes of explanation, numerous specific details are set forth in order to provide a thorough understanding of the subject disclosure. It may be evident, however, that the disclosure can be practiced without these specific details. In other instances, well-known structures and devices are shown in block diagram form in order to facilitate describing the disclosure.

Figure 2:
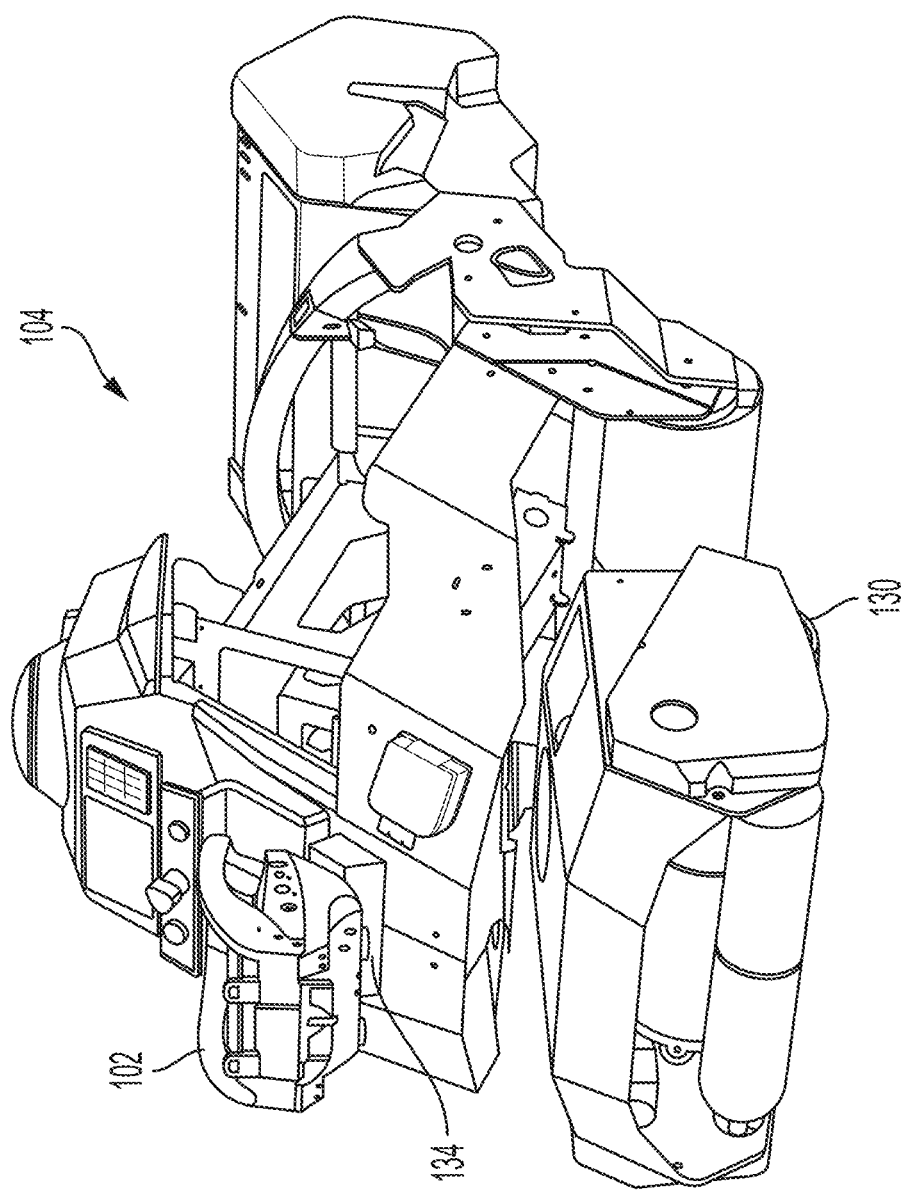
FIG. 2 is an illustration of an example user interface and remote control system and outdoor power equipment machine in accordance with aspects of the disclosure.

Referring to FIGS. 1 and 2, an operator control unit 102 for controlling operation of an outdoor power equipment machine 104 can be removably secured to the outdoor power equipment machine 104. The outdoor power equipment machine 104 can include an autonomous mower.

In an embodiment, the operator control unit 102 is located at a height that is within about an arm's length or less of an operator 106 standing immediately adjacent to the outdoor power equipment machine 104. As used herein, the term "arm's length" refers to a distance from the operator's shoulder to the tip of the fingers, the average human arm length being about twenty-five inches.

The operator control unit 102 can provide features including driving the outdoor power equipment machine 104, controlling operation of a payload associated with the outdoor power equipment machine 104, performing a mowing operation, and performing maintenance operations. The operator control unit 102 layout is intuitive and easy to operate with minimal training, and provides easy access to inputs with good ergonomics.

According to aspects, a mobile outdoor power equipment machine 102 includes a body supported by a chassis, one or more movable ground engaging members movably coupled to the chassis, a processing unit configured to analyze signals received by a control system of the mobile outdoor power equipment machine 104 having a processor and a memory.

The outdoor power equipment machine 104 can include a payload 130 or working apparatus, for example, a cutting unit. The payload 130 can include one or more cutting blades, vacuuming nozzles, rotating brushes, aerator, spreader, sprayer, rake, etc., depending on the function that the outdoor power equipment machine 104 is intended to serve.

The operator control unit 102 is removably attachable to the outdoor power equipment machine 104, and the outdoor power equipment machine 104 includes a docking port 134 located at the rear of the outdoor power equipment machine 104 configured to receive the operator control unit 102.

The operator control unit 102 can be removed from its position on the outdoor power equipment machine 104, and used by the operator 106 to control and operate the outdoor power equipment machine 104 remotely, from a distance. Rather than standing behind the outdoor power equipment machine 104 as it moves in a backward direction, the operator 106 can direct operation of the machine from a safe distance away.

When secured to the outdoor power equipment machine 104, the operator control unit 102 is located at a height that is within about an arm's length or less of an operator 106 standing immediately adjacent to the outdoor power equipment machine 104, as shown most clearly in FIG. 1.

Figure 3:
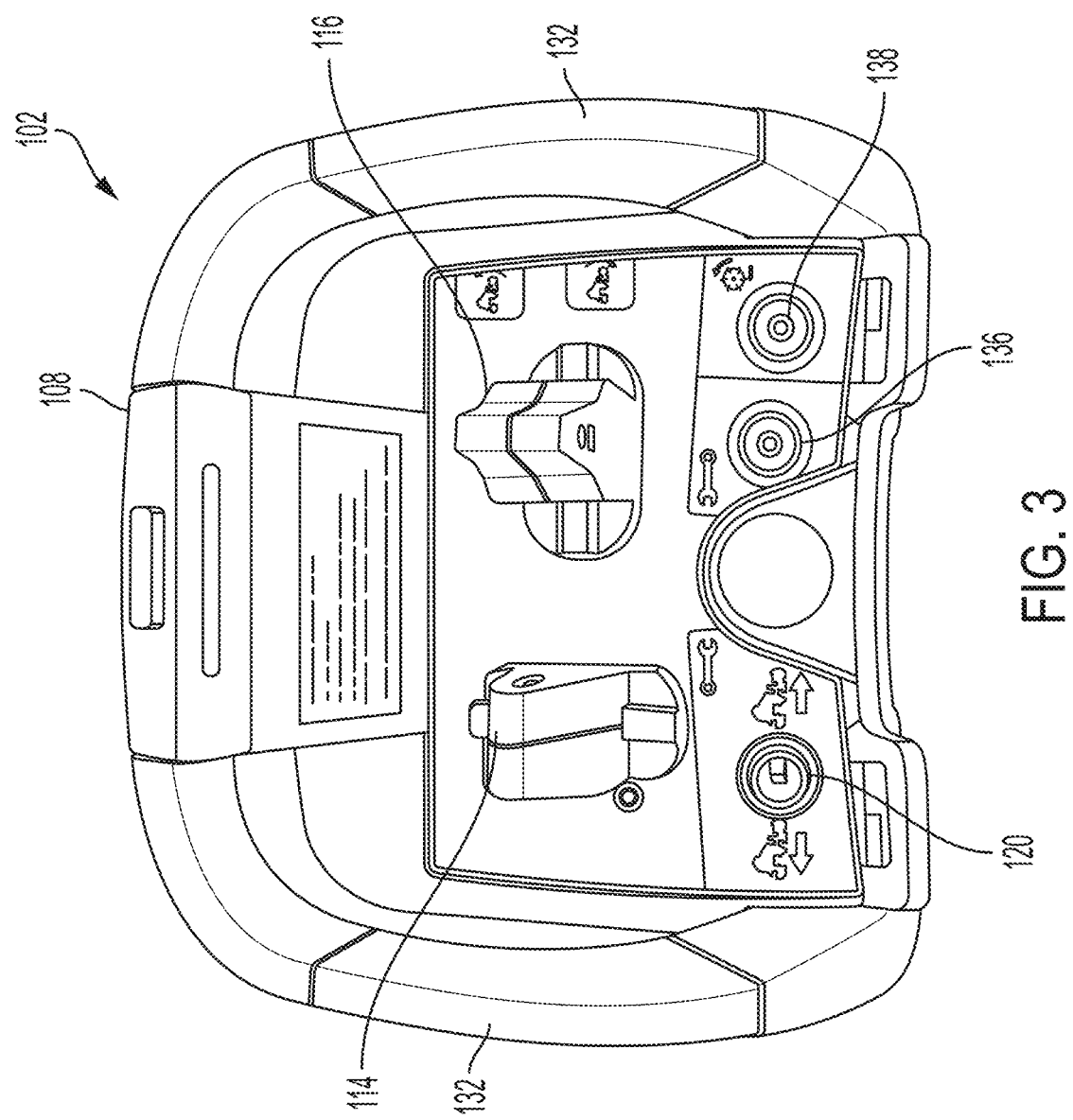
FIG. 3 is an illustration of an example user interface and remote control system and outdoor power equipment machine in accordance with aspects of the disclosure.
Figure 4:
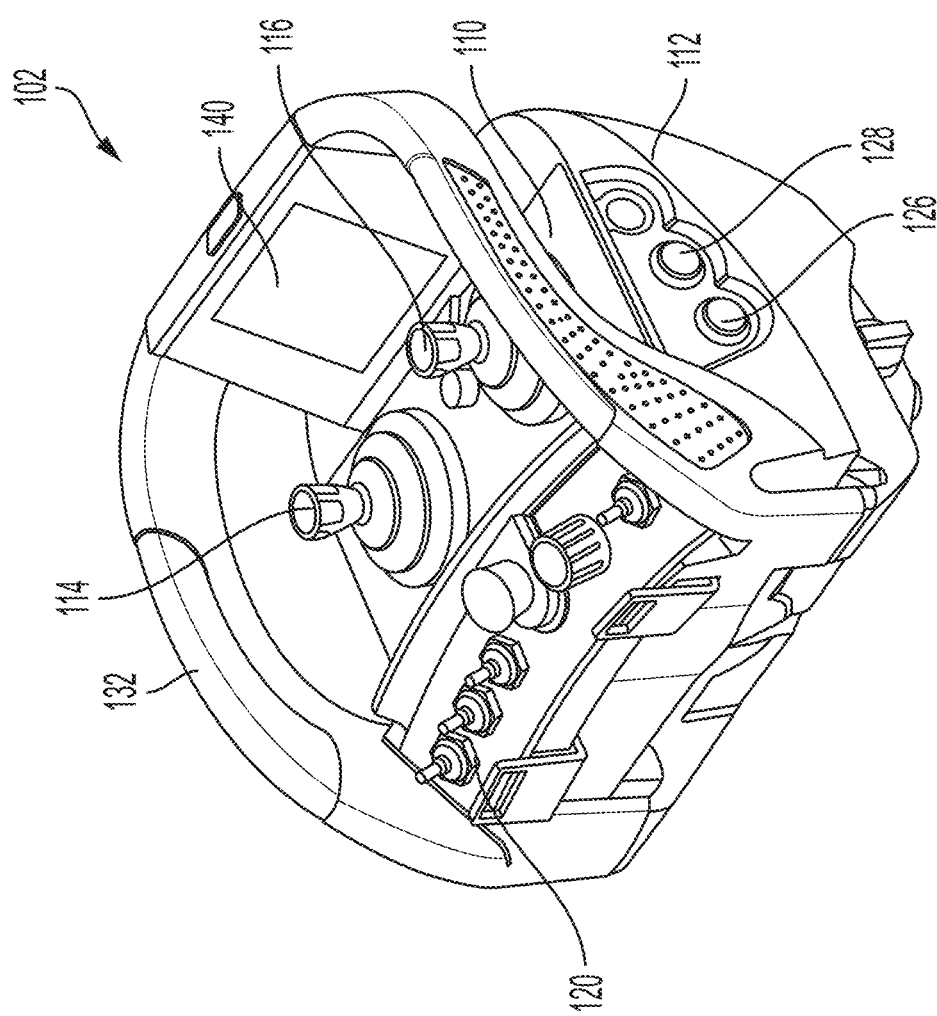
FIG. 4 is an illustration of an example user interface and remote control system in accordance with aspects of the disclosure.
Figure 5:
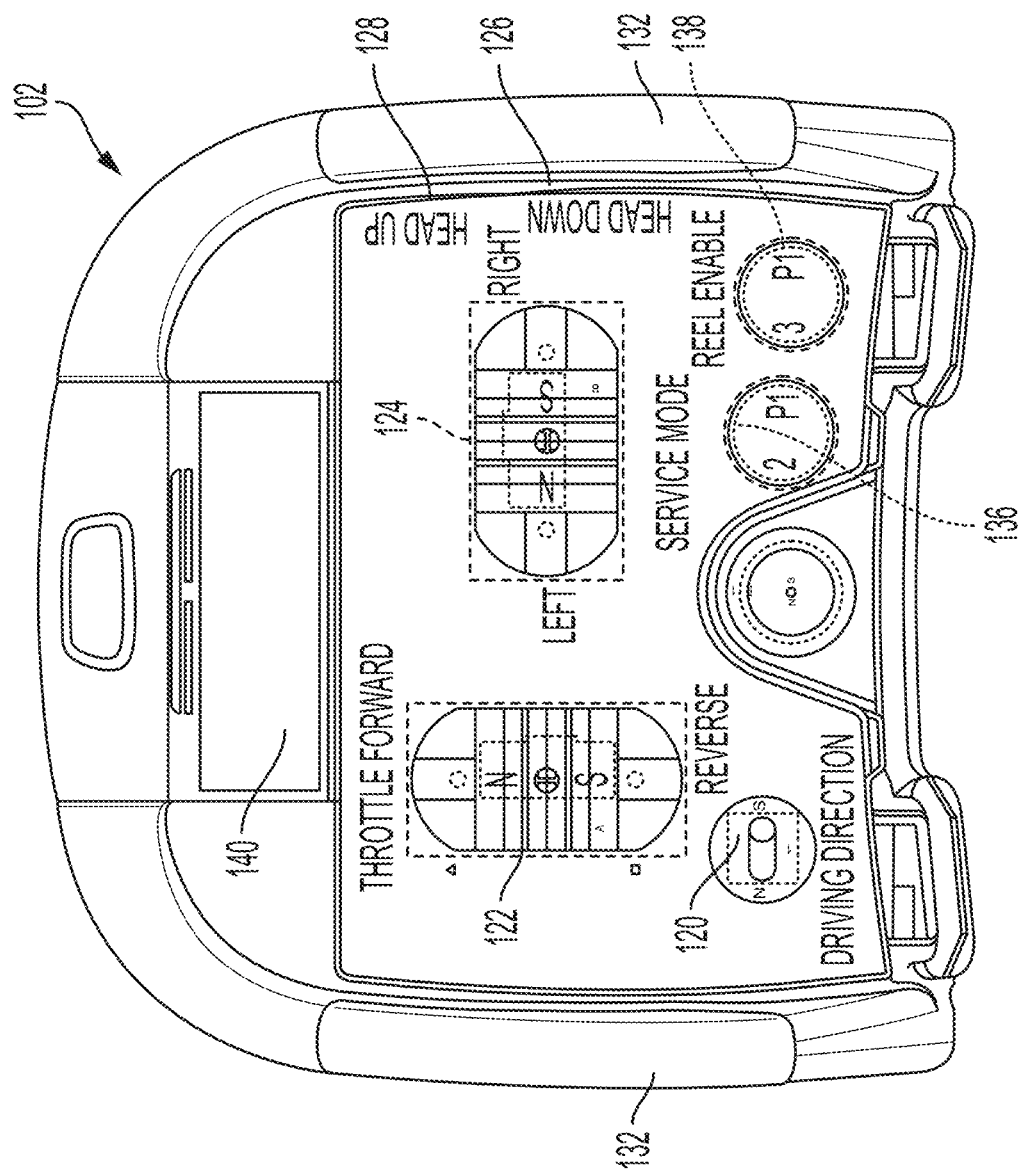
FIG. 5 is an illustration of an example user interface and remote control system in accordance with aspects of the disclosure.

Referring to FIGS. 3, 4 and 5, in an embodiment the operator control unit 102 includes a housing 108 including an upper housing portion 110 and a lower housing portion 112; a first joystick 114 and a second joystick 116 extending from the upper housing portion 110, the first and second joysticks 114, 116 being configured to communicate control actions to a control circuit of the operator control unit 102, switches 118 located on the upper housing portion 110, the switches 118 configured to communicate control actions to the control circuit.

Referring to FIG. 3, in an embodiment, a first joystick 114 is operable to control a forward and reverse motion and a forward and reverse speed of the outdoor power equipment machine 104. The joystick 114 can control the speed of the outdoor power equipment machine 104, operating as a throttle. Moving the joystick 114 upwards can proportionally increase the travelling speed of the machine 104, and moving the joystick 114 downwards can cause the machine 104 to move in reverse. The joystick 114 can be spring-loaded to return to center (straight) when released.

In further embodiments, the first joystick 114 is positioned to be operated by a left hand, for example, using the thumb of the left hand of the operator 106 and the second joystick 116 is positioned to be operated by a right hand of the operator 106, for example, using the thumb of the right hand. The second joystick 116 controls the steering of the outdoor power equipment machine 104. Moving the joystick 116 to the left causes a steering drum of the outdoor power equipment machine 104 to turn to cause a left turn, and movement of the joystick to the right causes a right turn. The joystick 116 can be spring-loaded to return to center (straight) when released.

In other embodiments, the first joystick 114 is positioned to be operated by a digit of a right hand of an operator 106, and the second joystick 116 is positioned to be operated by a digit of a left hand of the operator 106. Each of the first and second joysticks can be spring loaded and operate as a throttle, returning to a neutral position when released.

Still referring to FIG. 3, an example operator control unit 102 includes a toggle switch 120 moveable between a first position and a second position, the toggle switch 120 configured to communicate control actions to the control circuit. The control circuit is operable to receive control actions resulting from actuations of the joysticks 114, 116, switches 136, 138, and toggle switch 120, and to communicate utilizing an interface arranged between the operator control unit 102 and the outdoor power equipment machine 104.

The operator control unit 102 can include a handle arrangement 132 adapted to be held in at least one hand of an outdoor power equipment machine operator 106. In an example operator control unit 102, at least one of the first joystick 114 and the second joystick 116 are within operable reach of the operator's fingers without removing the hand from the handle. For example, the first joystick 114 can be using the thumb of the left hand of the operator 106, and the second joystick 116 can be operated by operator's 106 thumb of the right hand. The switch 128 can be pressed by the pointer finger on the operator's right hand, the switch 126 is typically pressed by the middle finger on the operator's right hand.

The joysticks 114, 116 and switches 120, 126, 128, 136, 138 of the operator control unit 102 are ergonomically positioned to be within comfortable reach of the operator's hands and fingers without removing the hands from the handle 132. This arrangement increases usability and user safety.

The operator control unit 102 can include a service switch 136. Actuation of the service switch 136 can cause the outdoor power equipment machine 104 to enter a service mode such that a payload 130 associated with the outdoor power equipment machine 104 is positioned to facilitate a maintenance operation. For example, upon actuation of the service switch 136, a cutting unit 130 associated with the outdoor power equipment machine 104 is raised to a position that facilitates a maintenance operation such as inspecting, sharpening or replacing the cutting blades.

The operator control unit 102 can include a payload switch 138. The payload switch 138 can control an operation of the payload 130. For example, the payload switch 138 can include a cutting reel switch, and actuation of the cutting reel switch controls motion of a cutting unit 130 associated with the outdoor power equipment machine 104. This allows the operator 106 to manually mow with the machine 104 using the operator control unit 102. System responses to the throttle 114 and steering levers 116 can be modified when the cutting reel is enabled, and the cutting unit is in the down position to better suit the manual-mowing mode. The service switch 136 and the payload switch 138 can include integral light emitting diode indicators.

The outdoor power equipment machine 104 can be made to travel in a first direction when the toggle switch 120 is in a first position, and the outdoor power equipment machine 104 travels in a second direction when the toggle switch 120 is in the second position. In an embodiment, when the toggle switch 120 is in the right position, the outdoor power equipment machine 104 operates with the payload 130, e.g., a cutting unit, as "forward"; when the joystick 114 is pushed upwards, the outdoor power equipment machine 104 will move in the direction of the cutting unit 130.

When the toggle switch 120 is in the left position the outdoor power equipment machine 104 operates with the payload 130, e.g., a cutting unit, as "backward"; when the joystick 114 is pushed upwards, the outdoor power equipment machine 104 moved in the direction opposite the cutting unit 130. Moving toggle switch 120 also inverts the outdoor power equipment machine's response to the steering input, since the machine changes between rear-steered, like a forklift, and front-steered, like a car.

In an embodiment, the user interface and remote control system 102 communicates with the outdoor power equipment machine 104 wirelessly, utilizing, for example, infra-red, Bluetooth, WLAN or Ethernet/LAN. In some embodiments, the user interface and remote control system 102 communicates with the outdoor power equipment machine 104 utilizing a wire or tether.

Turning to FIG. 4, the operator control unit 102 can include an optional display module 140, for displaying data and/or information associated with operation of the operator control unit 102, and/or the outdoor power equipment machine 104.

In embodiments, the operator control unit 102 can include momentary switches 126 and 128 located in the lower housing 112 portion of operator control unit 102. The momentary switches 126 and 128 communicate with the control circuit to cause action of a payload 130 associated with the outdoor power equipment machine 104 when either of the momentary switches 126, 128. In embodiments, a payload 130 of the outdoor power equipment machine 104 can include any of a mower cutting unit, blade or blades, brush, vacuum, blower, fan, lifting member, sprayer for applying water or other chemical to a ground surface, and the like.

In an embodiment, the payload 130 includes a cutting unit, and actuation of the first momentary switch 128 causes the cutting unit 130 to move upwardly, and actuation of the second momentary switch 126 causes the cutting unit 130 to move downwardly.

The operator control unit 102 can include two push button momentary switches 126, 128 located long the right edge. The switch 128 located towards the top (typically pressed by the pointer finger on the operator's right hand) cause the cutting head 130 to move to the up position. The switch 126 just below it (typically pressed by the middle finger on the operator's right hand) causes the cutting head to move to the down position.

In an embodiment, actuation of the service switch 136, the payload switch 138, and the first joystick 114 cause the outdoor power equipment machine 104 to operate in a maintenance mode, for example, a back lap mode which can be used to sharpen the blades of a reel mower. Back lapping is a maintenance operation that is performed periodically to sharpen/hone a mower cutting system.

An operator 106 can engage this maintenance mode by activating the service switch 136 and the payload switch 138 (in any order). When both switches 136, 138 are actuated, the outdoor power equipment machine 104 raises the cutting unit 130 to the up position. The steering lever, second joystick 116, no longer causes the machine 104 to steer. The operator 106 actuates joystick 114 in the down (reverse) position, which causing the cutting unit 130 to spin backward at an appropriate speed for back lapping.

Back lap mode can include a) disabling a steering mechanism of the outdoor power equipment machine, b) raising a cutting reel of the outdoor power equipment machine, and c) rotating the cutting reel in a reverse (counter-clockwise) direction at a back lapping speed.

In further embodiments, the operator control unit 102 is removably attachable to the outdoor power equipment machine 104, and the outdoor power equipment machine 104 includes a docking port 134 located at the rear of the outdoor power equipment machine 104 configured to receive the operator control unit 102.

The lower housing portion 112 the operator control unit 102 can include corresponding features for securing and docking the operator control unit 102 to the outdoor power equipment machine 104 at the docking port 134. When secured to the outdoor power equipment machine 104, the operator control unit 102 is located at a height that is within about an arm's length or less of an operator 106 standing immediately adjacent to the outdoor power equipment machine 104, as shown most clearly in FIG. 1.

In an embodiment, the operator control unit 102 includes an operator presence sensing system or operator presence control (OPC). For example, an operator presence control may be provided in a form that does not require any additional effort from the operator 106. For example, the operator control unit 102 can be provided with an electrical system that senses the presence and absence of the operator's hands respectively. In an embodiment, at least one hand of the operator 106 at the handle arrangement 132 must be sensed by the OPC system to enable operation of the operator control unit 102.

In an embodiment, the operator control unit 102 includes an operator presence sensing system configured to sense the presence of the at least one hand of an outdoor power equipment machine operator at the handle arrangement 132. In further embodiments, operation of the outdoor power equipment machine is enabled based on detection of two hands of the operator at the handle 132. The operator's safety is increased by requiring sensing of both of the operator's hands at the handle 132 of operator control unit 102 before the power equipment machine is allowed to operate. For example, the outdoor power equipment machine 104 is disabled when less than both of the operator's hands are sensed by the operator control unit 102

Referring to FIG. 5, in an embodiment, the operator control unit 102 includes a first joystick guide 122 having an elongated opening sized and shaped to receive the first joystick 114 and to allow movement of the first joystick 114 in a longitudinal direction, and a second joystick guide 124 having an elongated opening sized and shaped to receive the second joystick 116 and to allow movement of the second joystick 116 in a transverse direction.

Figure 6:
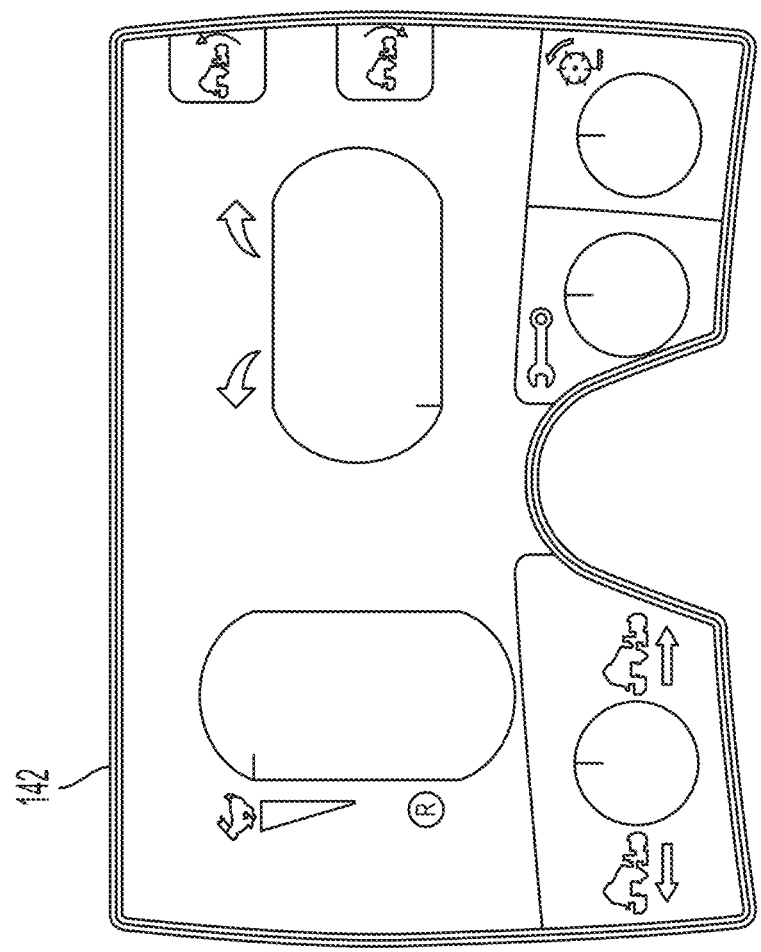
FIG. 6 is an illustration of an example overlay for a user interface and remote control system in accordance with aspects of the disclosure.

Referring to FIG. 6, an example user interface overlay 142 for the operator control unit 102 is shown. The user interface overlay 142 is overlaid onto the top portion of the operator control unit 102 and includes a plurality of circular and/or oblong openings for accommodating the first joystick 114, second joystick 116, service switch 136 and the payload switch 138. The user interface overlay 142 can include indicators or graphics for representative of the function and/or operation of joysticks 114, 116, and switches 136, 138.

While, for purposes of simplicity of explanation, a methodology is described as a series of acts, it is to be understood and appreciated that the subject disclosure is not limited by the order of acts, as some acts may, in accordance with the disclosure, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosure.

While embodiments of the disclosed operator control systems and methods for outdoor power equipment machines have been described, it should be understood that the operator control systems for outdoor power equipment machines are not so limited and modifications may be made without departing from the disclosed operator control systems for outdoor power equipment machines. The scope of the operator control systems for outdoor power equipment machines are defined by the appended claims, and all devices, processes, and methods that come within the meaning of the claims, either literally or by equivalence, are intended to be embraced therein.

The invention claimed is:

1. A removably attached operator control unit for controlling operation of an outdoor power equipment machine, comprising:
   an operator control unit housing including an upper housing portion and a lower housing portion;
   a first joystick and a second joystick extending from the upper housing portion, the first and second joysticks being configured to communicate control actions to a control circuit of the operator control unit;

at least one switch located on said upper housing portion, the switch configured to communicate control actions to the control circuit;

a toggle switch moveable between a first position and a second position, the toggle switch configured to communicate control actions to the control circuit;

wherein the control circuit is operable to receive control actions resulting from actuations of the joysticks, switch, and toggle switch and to communicate utilizing an interface arranged between the operator control unit and the outdoor power equipment machine;

wherein when secured to the outdoor power equipment machine, the operator control unit is located at a height that is within about an arm's length or less of an operator standing immediately adjacent to the outdoor power equipment machine; and wherein the at least one switch comprises a service switch and a cutting reel switch, and wherein actuation of the service switch, the cutting reel switch, and the first joystick cause a cutting unit associated with the outdoor power equipment machine to operate in a back lap mode.

2. The operator control unit of claim 1, comprising a handle adapted to be held in at least one hand of the outdoor power equipment machine operator, wherein at least one of the first joystick and the second joystick are within operable reach without removing the hand from the handle.

3. The operator control unit of claim 2, comprising an operator presence sensing system configured to sense the presence of the at least one hand of an outdoor power equipment machine operator at the handle.

4. The operator control unit of claim 3, wherein operation of the outdoor power equipment machine is enabled based on detection of two hands of the operator at the handle.

5. The operator control unit of claim 1, wherein the outdoor power equipment machine includes a docking port located at the rear of the outdoor power equipment machine configured to receive the operator control unit.

6. The operator control unit of claim 5, comprising corresponding features for securing and docking the operator control unit to the outdoor power equipment machine at the docking port.

7. The operator control unit of claim 1, comprising
a first joystick guide having an elongated opening sized and shaped to receive the first joystick and to allow movement of the first joystick in a longitudinal direction; and
a second joystick guide having an elongated opening sized and shaped to receive the second joystick and to allow movement of the second joystick in a transverse direction.

8. The operator control unit of claim 1, wherein the first joystick is operable to control a forward and reverse motion and a forward and reverse speed of the outdoor power equipment machine.

9. The operator control unit of claim 1, wherein the first joystick is positioned to be operated by a left hand of an operator and the second joystick is positioned to be operated by a right hand of the operator.

10. The operator control unit of claim 1, wherein the first joystick is positioned to be operated by a digit of a right hand of an operator and the second joystick is positioned to be operated by a digit of a left hand of the operator.

11. The operator control unit of claim 1, wherein the first joystick is spring loaded and operates as a throttle, returning to a neutral position when released, and the second joystick is operable to control a steering mechanism of the outdoor power equipment machine.

12. The operator control unit of claim 1, wherein the at least one switch comprises a first momentary switch and a second momentary switch configured to communicate with the control circuit to cause action of a payload associated with the outdoor power equipment machine when either of the first momentary switch and the second momentary switch are actuated.

13. The operator control unit of claim 12, wherein the payload comprises a the cutting unit and actuation of the first momentary switch causes the cutting unit to move upwardly, and actuation of the second momentary switch causes the cutting unit to move downwardly.

14. The operator control unit of claim 1, wherein the at least one switch comprises a service switch, wherein actuation of the service switch causes the outdoor power equipment machine to enter a service mode such that a the cutting unit is raised to a position that facilitates a maintenance operation.

15. The operator control unit of claim 1, wherein the at least one switch comprises a cutting reel switch, and wherein actuation of the cutting reel switch controls motion of the cutting unit.

16. The operator control unit of claim 1, wherein the service switch and the cutting reel switch comprise integral light emitting diode indicators.

17. The operator control unit of claim 1, wherein the back lap mode comprises:
disabling a steering mechanism of the outdoor power equipment machine;
raising a the cutting reel of the outdoor power equipment machine; and
rotating the cutting reel in a reverse (counter-clockwise) direction at a back lapping speed.

18. The operator control unit of claim 1, wherein the interface arranged between the operator control unit and the outdoor power equipment machine comprises a wireless interface.

19. The operator control unit of claim 1, wherein the outdoor power equipment machine comprises an autonomous mower.

* * * * *